US008560123B2

(12) United States Patent
Choi

(10) Patent No.: US 8,560,123 B2
(45) Date of Patent: Oct. 15, 2013

(54) ROBOT AND METHOD OF CONTROLLING COOPERATIVE WORK THEREOF

(75) Inventor: Jong Do Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 810 days.

(21) Appl. No.: 12/368,673

(22) Filed: Feb. 10, 2009

(65) Prior Publication Data

US 2009/0287354 A1  Nov. 19, 2009

(30) Foreign Application Priority Data

May 13, 2008  (KR) .................. 10-2008-0043772

(51) Int. Cl.
*G05B 19/04*  (2006.01)
*G05B 19/18*  (2006.01)
*G05B 15/00*  (2006.01)
*G05B 19/00*  (2006.01)

(52) U.S. Cl.
USPC ........... 700/263; 700/251; 700/260; 700/261; 700/262

(58) Field of Classification Search
None
See application file for complete search history.

(56) References Cited

U.S. PATENT DOCUMENTS

| 4,791,588 | A | * | 12/1988 | Onda et al. ............... 700/260 |
| 4,999,553 | A | * | 3/1991 | Seraji ..................... 700/245 |
| 5,260,629 | A | * | 11/1993 | Ioi et al. ................ 318/568.19 |
| 5,293,157 | A | * | 3/1994 | Yakou .................... 340/679 |
| 5,523,663 | A | * | 6/1996 | Tsuge et al. ............ 318/568.16 |
| 6,898,484 | B2 | * | 5/2005 | Lemelson et al. ........... 700/245 |
| 7,558,647 | B2 | * | 7/2009 | Okazaki .................... 700/260 |
| 8,140,189 | B2 | * | 3/2012 | Nagasaka ................... 700/262 |
| 2006/0184272 | A1 | * | 8/2006 | Okazaki et al. ............. 700/245 |

FOREIGN PATENT DOCUMENTS

| KR | 100160693 | 8/1998 |
| KR | 1999-0059516 | 7/1999 |

OTHER PUBLICATIONS

ImpedanceControl_notes_25.pdf (Impedance Control, Fall 2004, p. 1-14).*
electron9.pdf (Position and Displacement, http://electron9.phys.utk.edu/phys135d/modules/m1/position.htm, snapshot Feb. 2, 2007 from wayback machine website web.archive.org).*
Lewis, C., *Trajectory Generation for Two Robots Cooperating to Perform a Task*, Proceedings of the 1996 IEEE International Conference on Robotics and Automation, Minneapolis, Minnesota, Apr. 1996, pp. 1626-1631.
Mohri, A. et al., *Cooperative Path Planning for Two Manipulators*, Proceedings of the IEEE International Conference on Robotics and Automation, Minneapolis, Minnesota, Apr. 1996, pp. 2853-2858.

* cited by examiner

*Primary Examiner* — Khoi Tran
*Assistant Examiner* — Bao Long T Nguyen
(74) *Attorney, Agent, or Firm* — Staas & Halsey LLP

(57) ABSTRACT

Disclosed are a robot, which performs cooperative work with a plurality of robot manipulators through impedance control, and a method of controlling cooperative work of the robot. The method includes calculating absolute coordinate positions of end effectors, respectively provided at a plurality of manipulators to perform the work; calculating a relative coordinate position from the absolute coordinate positions of the end effectors; calculating joint torques of the plurality of manipulators using the relative coordinate position; and controlling the cooperative work of the plurality of manipulators according to the joint torques.

17 Claims, 4 Drawing Sheets

ROBOT AND METHOD OF CONTROLLING COOPERATIVE WORK THEREOF

CROSS-REFERENCE TO RELATED APPLICATIONS

This application claims the benefit of Korean Patent Application No. 2008-0043772, filed May 13, 2008, in the Korean Intellectual Property Office, the disclosure of which is incorporated herein by reference.

BACKGROUND

1. Field

The present invention relates to a robot and a method of controlling cooperative work thereof, and more particularly, to a robot, which performs cooperative work using a plurality of robot manipulators through impedance control, and a method of controlling cooperative work of the robot.

2. Description of the Related Art

In general, machines, which conduct motions similar to that of a human using an electric or magnetic action, are referred to as robots. Recently, robots have been applied to various fields due to development of a control technique. For example, there are housekeeping robots in homes, service robots in public facilities, transfer robots in industrial sites, and worker supporting robots. These robots perform work using manipulators, which are designed to conduct motions similar to that of an arm or a hand of a human through electrical and/or mechanical mechanisms.

Most robot manipulators, which are used now, include a plurality of links connected to each other. Connection parts between the links are referred to as joints, and motion characteristics of the manipulators are determined by the geometrical relation between the links and the joints. Kinematics mathematically expresses the geometrical relation. Robot manipulators having these kinematics characteristics respectively move end effectors thereof in a direction to perform work.

FIG. 1 illustrates a conventional method of performing cooperative work using robot manipulators.

As shown in FIG. 1, in order to remove a lid from a bottle by rotating the lid, at least two robot manipulators 1 and 3 are required, and in this case, the two robot manipulators 1 and 3 must perform cooperative work. In order to perform the cooperative work using the two robot manipulators 1 and 3, a control unit 5 calculates absolute positions of the two robot manipulators 1 and 3 by calculating trajectories of two end effectors 1-1 and 3-1, and calculates joint torques according to the positions and direction vectors of the two end effectors 1-1 and 3-1, thus respectively controlling the robot manipulators 1 and 3. Korean Patent Registration No. 0160693 discloses an example of the method of performing cooperative work using two robot manipulators.

However, in the conventional method of performing cooperative work using robot manipulators, since the positions and directions of the two end effectors 1-1 and 3-1 in respective absolute coordinate systems are required to calculate the trajectory of the robot, a user takes the positions and directions of the two end effectors 1-1 and 3-1 into consideration individually when a complicated cooperative work is performed, and thus is inconvenienced by the calculation. Further, if one robot manipulator 3 performs cooperative work when the other robot manipulator 1 grips an object and fixes the position of the object, a working space is restricted by the limit of joint angles.

SUMMARY

Accordingly, one aspect of the invention is to provide a robot, which performs cooperative work without the limit of a working space through impedance control using a relative Jacobian of one end effector to another end effector, and a method of controlling cooperative work of the robot.

Additional aspects and/or advantages will be set forth in part in the description which follows and, in part, will be apparent from the description, or may be learned by practice of the invention.

The foregoing and/or other aspects of the present invention are achieved by providing a method of controlling cooperative work of a robot, the method including calculating absolute coordinate positions of end effectors of the robot respectively provided at a plurality of manipulators of the robot to perform the work; calculating a relative coordinate position from the absolute coordinate positions of the end effectors; calculating joint torques of the plurality of manipulators using the calculated relative coordinate position; and controlling the cooperative work of the plurality of manipulators according to calculated the joint torques.

In the calculating of the absolute coordinate positions of the end effectors, joint angles of the plurality of manipulators may be measured and the current absolute coordinate positions of the end effectors may be calculated using a function of the measured joint angles.

The method may further include determining whether or not the absolute coordinate positions of the end effectors reach a target position, inputted in advance, and the cooperative work of the plurality of manipulators may be terminated when it is determined that the absolute coordinate positions of the end effectors reach the target position.

The target position may be inputted by tracking the trajectory of one end effector out of the plural end effectors to the coordinate position of another end effector out of the plural end effectors.

In the calculating of the relative coordinate position, the relative coordinate position of an opponent end effector may be calculated from the absolute coordinate positions of the respective end effectors.

The relative coordinate position may be a value obtained by subtracting the absolute coordinate position of the opponent end effector from the absolute coordinate position of any one end effector of the plural end effectors.

The method may further include calculating a relative Jacobian of an opponent end effector to any one end effector of the plural end effectors, and the calculating of the relative Jacobian may be achieved by acquiring an impedance control input using a Jacobian matrix according to the relative coordinate position.

The impedance control input may be acquired by calculating the joint torques of the plurality of manipulators using the relative Jacobian and the relative coordinate position.

The foregoing and/or other aspects of the present invention may be achieved by providing a method of controlling cooperative work of a robot comprising calculating absolute coordinate positions of first and second end effectors, respectively provided at first and second manipulators to perform the work; calculating a relative coordinate position of one of the end effectors from the absolute coordinate position of the other of the end effectors; calculating joint torques of the first and second manipulators using the relative coordinate position; and controlling the cooperative work of the first and second manipulators according to the calculated joint torques.

In the calculating of the absolute coordinate positions of the first and second end effectors, joint angles of the plurality of manipulators may be measured and the current absolute coordinate positions of the first and second end effectors may be calculated using a function of the measured joint angles.

The method may further include calculating a relative Jacobian of an opponent end effector to any one end effector of the first and second end effectors, and the calculating of the relative Jacobian may be achieved by acquiring an impedance control input using a Jacobian matrix according to the relative coordinate position calculated from the current absolute coordinate positions.

An impedance control expression to calculate the joint torques of the first and second manipulators is described below:

$$(\tau A, \tau B) = Jrel Krel(Xdrel - Xrel),$$

Here, Jrel is the relative Jacobian, Xdrel is the target position, Xrel is the relative position, Krel is a stiffness coefficient inputted in advance to a relative coordinate system, and $\tau A$ and $\tau B$ are the joint torques of the first and second manipulators.

The foregoing an/or other aspects of the present invention are achieved by providing a robot comprising a plurality of manipulators to perform work; a plurality of end effectors respectively provided at the plurality of manipulators; a relative position calculating unit to calculate a relative coordinate position from absolute coordinate positions of the plurality of end effectors; and a control unit to calculate joint torques of the plurality of manipulators using the relative coordinate position and to control the cooperative work of the plurality of manipulators according to the calculated joint torques.

The relative position calculating unit may calculate the relative coordinate position of an opponent end effector from the absolute coordinate positions of the plurality of end effectors.

The relative coordinate position may be a value obtained by subtracting the absolute coordinate position of the opponent end effector from the absolute coordinate position of any one end effector of the plurality of end effectors.

The robot may further comprise a relative Jacobian generating unit to calculate a relative Jacobian of an opponent end effector to any one end effector of the plural end effectors, and the relative Jacobian generating unit may acquire an impedance control input using a Jacobian matrix using the relative coordinate position.

The impedance control input may be acquired by calculating the joint torques of the plurality of manipulators using the relative Jacobian and the relative coordinate position.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Figure 1:
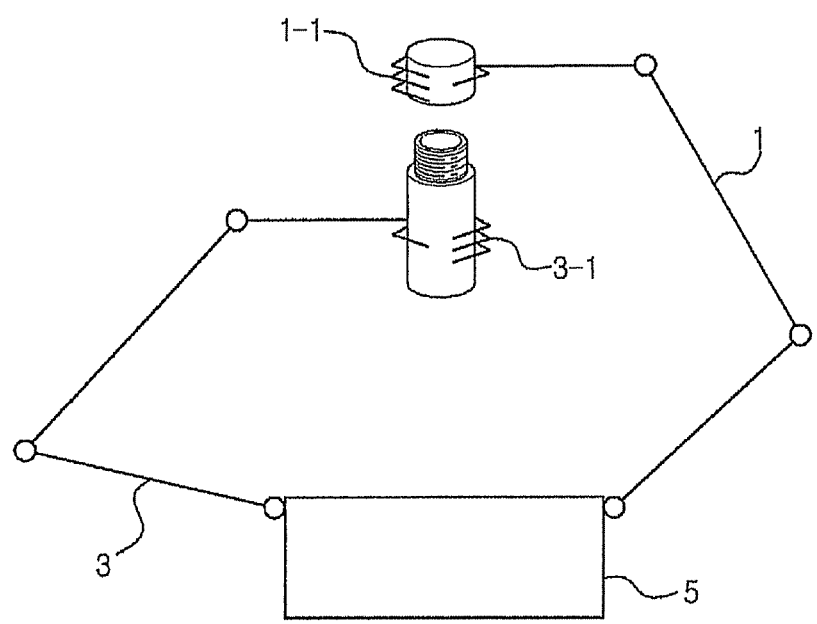
FIG. 1 is a view illustrating a conventional method of performing cooperative work using robot manipulators.

Reference will now be made in detail to an embodiment, an example of which is illustrated in the accompanying drawings, wherein like reference numerals refer to like elements throughout. The embodiment is described below to explain the present invention by referring to the annexed drawings.

Figure 2:
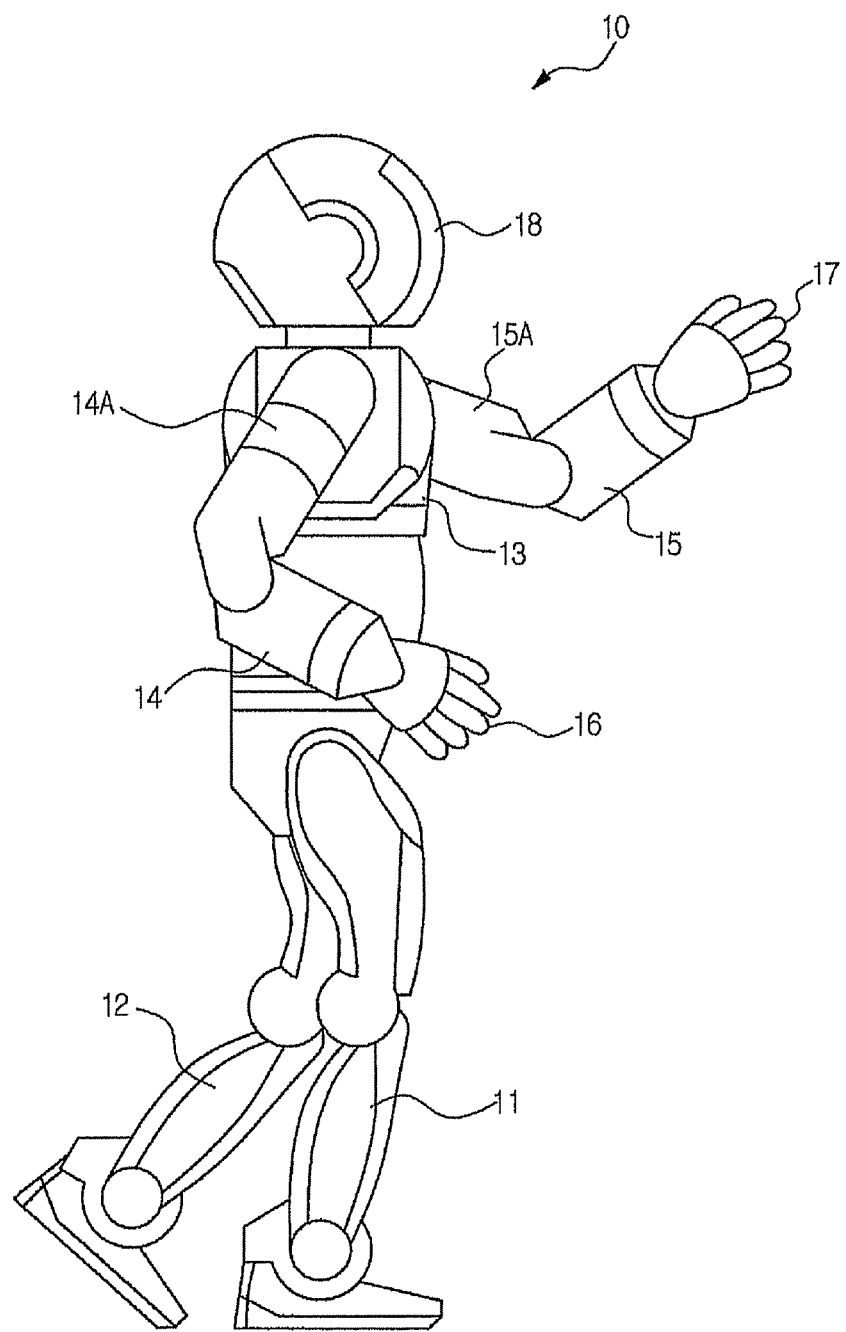
FIG. 2 is a schematic view illustrating the external appearance of a robot in accordance with an embodiment of the present invention.

FIG. 2 is a schematic view illustrating the external appearance of a robot in accordance with an embodiment of the present invention.

In FIG. 2, a robot 10 of the present invention is a biped walking robot, which walks erect using two legs 11 and 12 like a human, and has an upper body 13, two arms 14 and 15 (hereinafter, referred to as first and second manipulators), and a head 18 as well as the two legs 11, thus autonomously walking.

First and second manipulators 14 and 15 respectively include a plurality of links 14A and 15A, which are connected to each other such that parts of the robots 10 corresponding to the shoulders, elbows, and wrists of a human can rotated. Connection parts between the links 14A and 15A are referred to as joints. Here, the term 'degree of freedom' is a measure of whether or not there are axes, which can move to some degree according to the motion of the joints. For example, a link having an axis in one direction is determined to have 1 degree of freedom.

End effectors 16 and 17 to perform a job corresponding to the operation of the human body, such as a gripper to grip a target object, a spray gun used to coat the target object, an electrode contact point for spot welding, a welding torch for welding, a drill, a grinder, a water jet nozzle for cutting, are respectively provided at the front ends of the first and second manipulators 14 and 15.

Figure 3:
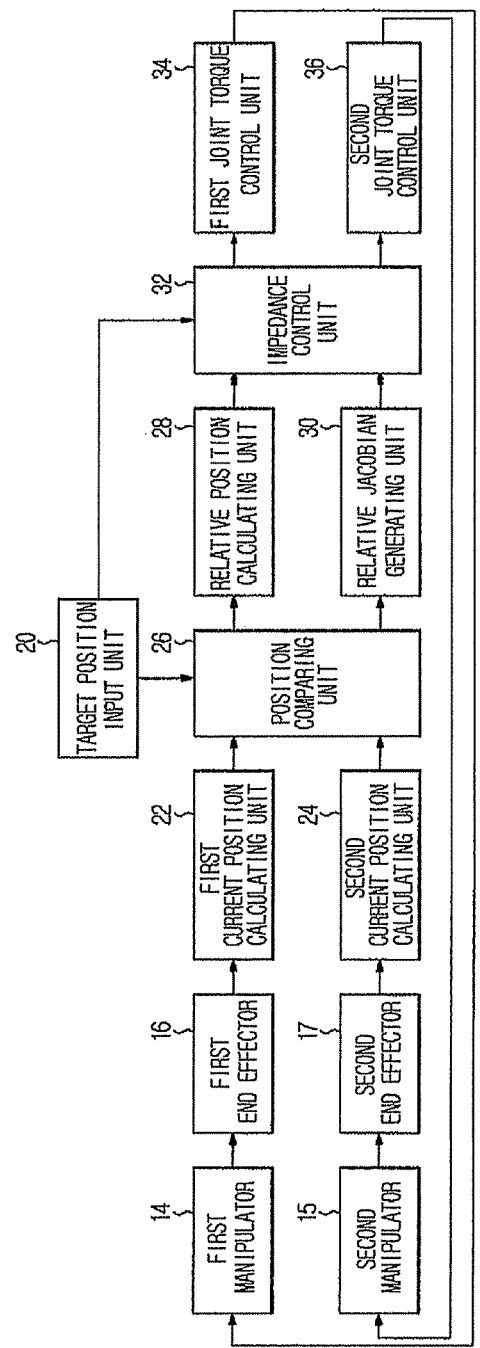
FIG. 3 is a control block diagram of manipulators of the robot in accordance with the embodiment of the present invention.

FIG. 3 is a control block diagram of manipulators of the robot in accordance with the embodiment of the present invention. The robot 10 includes a target position input unit 20, first and second current position calculating units 22 and 24, a position comparing unit 26, a relative position calculating unit 28, a relative Jacobian generating unit 30, an impedance control unit 32, and first and second joint torque control units 34 and 36.

The target position input unit 20 inputs a target relative position Xdrel (hereinafter, referred to as 'a target position'), to which the first and second manipulators 14 and 15 will move, on the trajectory of the second end effector 17 (or the first end effector 16) to the coordinate system of the first end effector 16 (or the second end effector 17) in order to perform cooperative work using the first and second manipulators 14 and 15.

The first and second current position calculating units 22 and 24 read joint angles $\theta A$ and $\theta B$ of the first and second manipulators 14 and 15 using position sensors (or speed sensors, such as tachometers) to respectively measure the joint angles $\theta A$ and $\theta B$ of the first and second manipulators 14 and 15, and calculate current absolute coordinate positions XA and XB (hereinafter, referred to as 'current positions') of the first and second end effectors 16 and 17 from the read joint angles $\theta A$ and $\theta B$.

The position comparing unit 26 compares the current positions XA and XB of the first and second end effectors 16 and 17, calculated by the first and second current position calculating units 22 and 24, with the input target position Xdrel, and determines whether or not the current positions XA and XB of the first and second end effectors 16 and 17 reach the input target position Xdrel.

The relative position calculating unit 28 calculates a relative coordinate position Xrel (hereinafter, referred to as 'a relative position'), i.e., a relative coordinate system, from the current positions XA and XB of the first and second end effectors 16 and 17, when the current positions XA and XB of the first and second end effectors 16 and 17 do not reach the target position Xdrel, as a result of the determination by the position comparing unit 26.

The relative Jacobian generating unit 30 calculates a relative Jacobian Jrel of the second or first end effector 17 or 16 to the first or second end effector 16 or 17 using the relative position Xrel calculated by the relative position calculating unit 28, i.e., the relative coordinate system. The cooperative work control method of the embodiment of the present invention, which calculates the relative Jacobian Jrel using the relative coordinate system, can intuitively achieve a motion compared with the conventional method using an absolute coordinate system, and utilize a sufficient redundant degree of freedom through impedance control, in which the first and second manipulators 14 and 15 are controlled just like a single integrated manipulator.

The impedance control unit 32 performs impedance control to calculate joint torques τA and τB of the first and second manipulators 14 and 15 using the relative Jacobian Jrel, calculated by the relative Jacobian generating unit 30, the target position Xdrel, inputted by the target position input unit 20, the relative position Xrel, calculated by the relative position calculating unit 28, and a stiffness coefficient Krel inputted in advance to the relative coordinate system. Here, the stiffness coefficient Krel is a stiffness coefficient in impedance control, and has a value, which was inputted in advance.

The first and second joint torque control units 34 and 36 move the first and second manipulators 14 and 15 to the target position Xdrel based on the order of the joint torques τA and τB of the first and second manipulators 14 and 15, calculated by the impedance control unit 32, and thus allow the first and second manipulators 14 and 15 to perform cooperative work.

Hereinafter, the moving process and function of the above robot and the method of controlling cooperative work thereof will be described.

In order to describe the moving principle of the robot of the embodiment of the present invention, the Jacobian and impedance control of the first and second manipulators 14 and 15 will first be described.

The current positions of the first and second end effectors 16 and 17 are represented by a function of a joint angle θ, as shown in expression 1 below.

$$X = f(\theta) \quad \text{[Expression 1]}$$

In expression 2 below, obtained by differentiating expression 1, J is a Jacobian, and denotes mapping of a Cartesian space and a space of the function of the joint angle θ.

$$\dot{X} = J\dot{\theta} \quad \text{[Expression 2]}$$

Herein, J represents the Jacobian to an absolute coordinate system.

The impedance control is a control method to overcome a limit in position control having a high stiffness K (stiffness coefficient in impedance characteristics) and properly adjust the stiffness to apply a proper force when the first and second manipulators 14 and 15 interact. The impedance control in the Cartesian space is represented by Expression 3 below.

$$\tau = J^T K (X_d - X) \quad \text{[Expression 3]}$$

Here, X represents the current positions of the first and second end effectors 16 and 17, Xd represents the target position of the first and second end effectors 16 and 17, and T represents the joint torques of the first and second manipulators 14 and 15. $J^T$ represents a transpose matrix of the Jacobian to an absolute coordinate system.

In order to allow the first and second manipulators 14 and 15 to perform cooperative work using impedance control, the positions of the first and second end effectors 16 and 17 from the trajectories of the first and second end effectors 16 and 17 on the absolute coordinate system are first calculated, and then the joint torques are calculated using expression 3. However, in order to give the order of the joint torques through the above process, a user must take the positions of the first and second end effectors 16 and 17 into consideration individually, and thus feels the inconvenience of having to make calculations. In order to overcome such a drawback, the embodiment of the present invention proposes the concept of the relative Jacobian, in which the relative coordinates of the second end effector 17 (or the first end effector 16) to the first end effector 16 (or the second end effector 17) are intuitively given. The concept of the relative Jacobian in the embodiment of the present invention uses a method disclosed in references 1 and 2 below, and will be described in detail with reference to FIG. 4.

Reference 1: Akira Mohri, "Cooperative Path Planning for Two Manipulators", International Conf. on Robotics and Automation pp. 2853-2858, 1996

Reference 2: Christopher L. Lewis, "Trajectory Generation For Two Robots Cooperating To Perform A Task", Inter. Conf. on Robotics and Automation pp. 1626-1631, 1996

Figure 4:
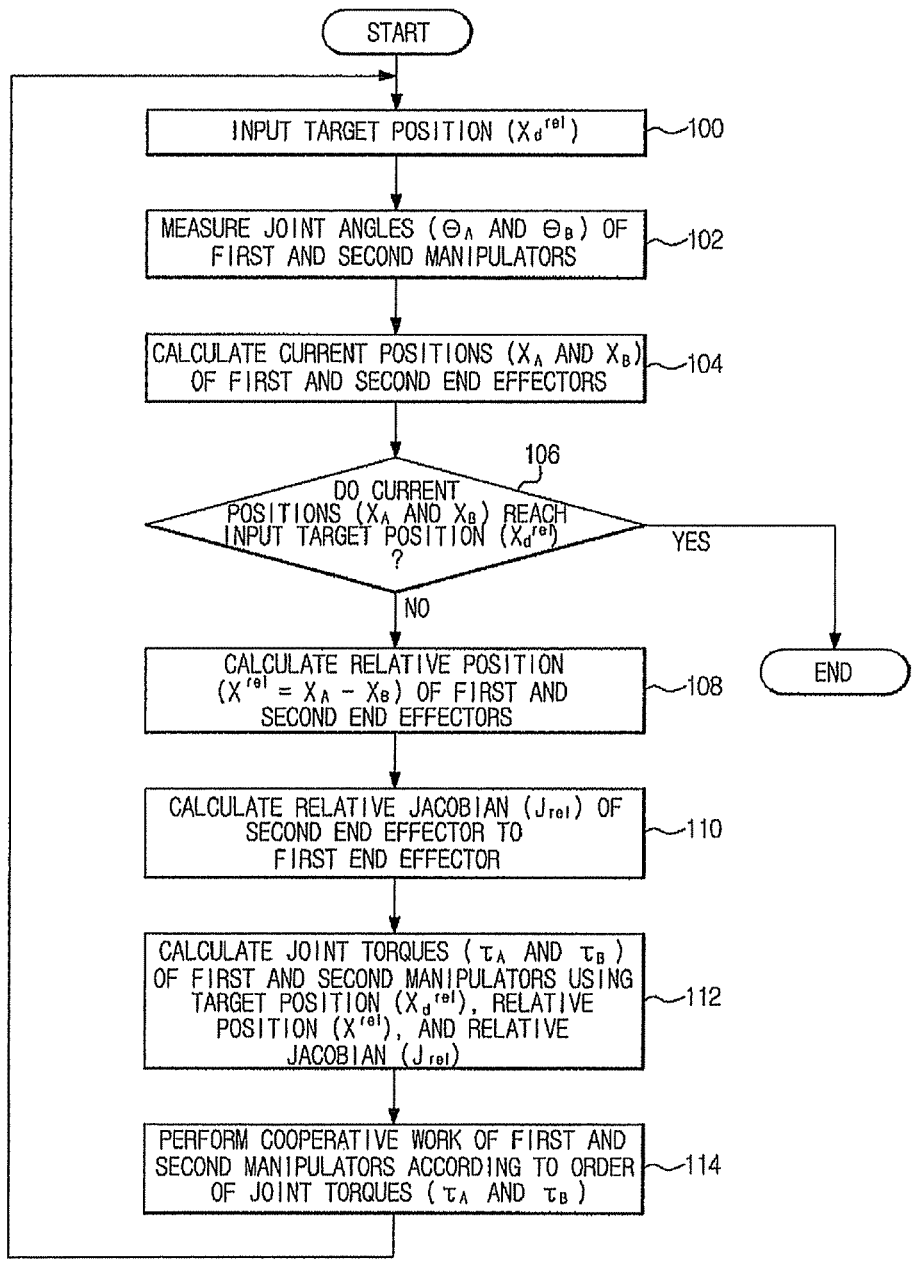
FIG. 4 is a flow chart illustrating a method of controlling cooperative work of a robot in accordance with an embodiment of the present invention.

FIG. 4 is a flow chart illustrating a method of controlling cooperative work of a robot in accordance with an embodiment of the present invention.

In FIG. 4, in case that at least two manipulators, i.e., the first and second manipulators 14 and 15, are required to perform the work to a target object, the first and second manipulators 14 and 15 perform cooperative work. In order to allow the first and second manipulators 14 and 15 to perform cooperative work, the target position input unit 20 inputs a target position Xdrel, to which the first and second manipulators 14 and 15 will move, on the trajectory of the second end effector 17 (or the first end effector 16) to the coordinate system of the first end effector 16 (or the second end effector 17) (operation 100). Here, the target position Xdrel is inputted by a user (or a program designer).

When the target position Xdrel is inputted, the first and second current position calculating units 22 and 24 read joint angles θA and θB of the first and second manipulators 14 and 15 using position sensors (or speed sensors, such as tachometers) to respectively measure the joint angles θA and θB of the first and second manipulators 14 and 15 (operation 102), and respectively calculate current positions XA and XB of the first and second end effectors 16 and 17 from the read joint angles θA and θB (operation 104).

Thereafter, the position comparing unit 26 compares the current positions XA and XB of the first and second end effectors 16 and 17, calculated by the first and second current position calculating units 22 and 24, with the inputted target position Xdrel, and determines whether or not the current positions XA and XB of the first and second end effectors 16 and 17 reach the target position Xdrel (operation 106).

As a result of the determination of operation 106, when the current positions XA and XB of the first and second end effectors 16 and 17 reach the target position Xdrel, the cooperative work using the first and second manipulators 14 and 15 is terminated, and when the current positions XA and XB of the first and second end effectors 16 and 17 do not reach the target position Xdrel, the relative position calculating unit 28 calculates a relative coordinate position Xrel (here, Xrel=XA−XB), i.e., a relative coordinate system, from the current positions XA and XB of the first and second end effectors 16 and 17 (operation 108).

Thereafter, the relative Jacobian generating unit 30 calculates a relative Jacobian Jrel of the second end effector 17 (or the first end effector 16) to the first end effector 16 (or the second end effector 17) using the relative position Xrel calculated by the relative position calculating unit 28, i.e., the relative coordinate system (operation 110). The cooperative work control method of the embodiment of the present invention, which calculates the relative Jacobian Jrel using the relative coordinate system, can intuitively achieve a motion compared with the conventional method using the absolute coordinate system, and utilize a sufficient redundant degree of freedom through impedance control, in which the first and second manipulators 14 and 15 are controllable just like a single integrated manipulator.

In order to calculate the relative Jacobian Jrel using the relative coordinate system of the second end effector 17 (or the first end effector 16) to the first end effector 16 (or the second end effector 17), the method disclosed in references 1 and 2 above was used.

When the relative Jacobian Jrel of one end effector (for example, the second end effector 17) to another end effector (for example, the first end effector 16) is calculated using the method disclosed in references 1 and 2 above, the impedance control unit 32 performs impedance control using the relative Jacobian Jrel, inputted from the relative Jacobian generating unit 30, the target position Xdrel, inputted from the target position input unit 20, the relative position Xrel, calculated by the relative position calculating unit 28, and thus calculates joint torques $\tau A$ and $\tau B$ of the first and second manipulators 14 and 15, and inputs the joint torques $\tau A$ and $\tau B$ to the first and second joint torque control units 34 and 36 (operation 112).

An impedance control expression to calculate the joint torques $\tau A$ and $\tau B$ of the first and second manipulators 14 and 15 is represented by expression 4 below.

$$(\tau A, \tau B) = JrelKrel(Xdrel - Xrel)$$ [Expression 4]

Here, Krel is a stiffness coefficient, which is inputted in advance to the relative coordinate system.

The impedance control uses an algorithm, which applies a proper force when the first and second manipulators 14 and 15 interact to provide a stiffness or softness to the motion of the first and second manipulators 14 and 15, and thus calculates the order of the joint torques $\tau A$ and $\tau B$ such that the first and second manipulators 14 and 15 can move to a desired position and perform cooperative work.

Thus, the first and second joint torque control units 34 and 36 move the first and second manipulators 14 and 15 to the target position Xdrel based on the order of the joint torques $\tau A$ and $\tau B$ of the first and second manipulators 14 and 15, calculated by the impedance control unit 32, and thus allow the first and second manipulators 14 and 15 to perform cooperative work (operation 114), and then subsequent operations are repeated until the first and second manipulators 14 and 15 reach the target position Xdrel.

Although the embodiment of the present invention describes the humanoid robot having the two manipulators 14 and 15, the present invention is not limited thereto. That is, in case that cooperative work is performed using several industrial robots, the several robots can be controlled just like a single robot through impedance control using a relative Jacobian, and thus a sufficient redundant degree of freedom is obtained, thereby overcoming a limit of a working space.

As apparent from the above description, the embodiment of the present invention provides a robot and a method of controlling cooperative work of the robot, in which a plurality of robot manipulators perform cooperative work through impedance control using a relative Jacobian of one end effector to another end effector, thus obtaining a sufficient redundant degree of freedom such that the plurality of robot manipulators is controlled just like a single robot manipulator, and overcoming a limit of a working space.

Although an embodiment of the invention has been shown and described, it would be appreciated by those skilled in the art that changes may be made in these embodiments without departing from the principles and spirit of the invention, the scope of which is defined in the claims and their equivalents.

What is claimed is:

1. A method of controlling cooperative work of a robot, the method comprising:
    inputting a target position;
    calculating absolute coordinate positions of end effectors of the robot, respectively provided at a plurality of manipulators of the robot to perform the work;
    determining whether the absolute coordinate positions of the end effectors reach the target position by comparing the calculated absolute coordinate positions with the input target position; and
    if it is determined that the absolute coordinate positions of the end effectors do not reach the target position,
       calculating a relative coordinate position from the absolute coordinate positions of the end effectors;
       calculating a relative Jacobian of one of the end effectors opposite to another one of the end effectors;
       calculating joint torques of the plurality of manipulators using the target position, the calculated relative coordinate position and the calculated relative Jacobian; and
       controlling the cooperative work of the plurality of manipulators according to an order of the calculated joint torques;
    wherein the calculating of the relative Jacobian comprises acquiring an impedance control input using a Jacobian matrix according to the relative coordinate position.

2. The method according to claim 1, wherein the calculating of the absolute coordinate positions of the end effectors comprises measuring joint angles of the plurality of manipulators and the calculating the absolute coordinate positions of the end effectors comprises using a function of the measured joint angles.

3. The method according to claim 1,
    wherein the cooperative work of the plurality of manipulators is terminated when it is determined that the absolute coordinate positions of the end effectors reach the target position.

4. The method according to claim 3, wherein the inputting the target position comprises tracking a trajectory of one of the end effectors—to the coordinate position of another of the end effectors.

5. The method according to claim 1, wherein in the calculating of the relative coordinate position comprises calculating the relative coordinate position based upon an opposite one of the end effectors—from the calculated absolute coordinate positions.

6. The method according to claim 5, further comprising subtracting the absolute coordinate position of the opposite one of the end effectors from the absolute coordinate position of any one of the end effectors to determine the relative coordinate position.

7. The method according to claim 1, further comprising acquiring the impedance control input comprising calculating the joint torques of the plurality of manipulators using the relative Jacobian and the relative coordinate position.

8. The method according to claim 1, wherein in the calculating a relative Jacobian of one of the end effectors opposite to another one of the end effectors, a single relative Jacobian is calculated.

9. A method of controlling cooperative work of a robot comprising:
inputting a target position;
calculating absolute coordinate positions of first and second end effectors, respectively provided at first and second manipulators to perform the work;
determining whether the absolute coordinate positions of the end effectors reach the target position by comparing the absolute coordinate positions of the first and second end effectors with the input target position;
if it is determined that the absolute coordinate positions of the first and second end effectors do not reach the target position,
calculating a relative coordinate position of one of the end effectors from the absolute coordinate position of the other of the end effectors;
calculating a relative Jacobian of one of the end effectors relative to the other end effector;
calculating joint torques of the first and second manipulators using the relative coordinate position; and
controlling the cooperative work of the first and second manipulators according to the calculated joint torques;
wherein the calculating of the relative Jacobian comprises acquiring an impedance control input using a Jacobian matrix according to the relative coordinate position calculated from the absolute coordinate positions.

10. The method according to claim 9, wherein the calculating of the absolute coordinate positions of the first and second end effectors comprises measuring joint angles of the plurality of manipulators and the calculating the absolute coordinate positions of the first and second end effectors comprises using a function of the measured joint angles.

11. The method according to claim 10, wherein an impedance control expression to calculate the joint torques of the first and second manipulators is:

$$(\tau_A, \tau_B) = J_{rel} K_{rel} (X_d^{rel} - X^{rel})$$

wherein, $J_{rel}$ is the relative Jacobian, $X_d^{rel}$ is the target position, $X^{rel}$ is the relative position, $K_{rel}$ is a stiffness coefficient inputted in advance to a relative coordinate system, and $\tau_A$ and $\tau_B$ are the joint torques of the first and second manipulators.

12. The method according to claim 9, wherein in the calculating a relative Jacobian of one of the end effectors opposite to another one of the end effectors, a single relative Jacobian is calculated.

13. A robot comprising:
a plurality of manipulators to perform work;
a plurality of end effectors respectively provided at the plurality of manipulators;
a target position input unit to input a target position;
a plurality of current position calculating units to calculate absolute coordinate positions of the end effectors;
a position comparing unit to compare the calculated absolute coordinate positions of the end effectors with the input target position, and determines whether or not the absolute coordinate positions of the end effectors reach the input target position;
a relative position calculating unit to calculate a relative coordinate position from the absolute coordinate positions of the plurality of end effectors if it is determined that the absolute coordinate positions of the end effectors does not reach the input target position;
a control unit to calculate joint torques of the plurality of manipulators using the relative coordinate position and to control the cooperative work of the plurality of manipulators according to the calculated joint torques; and
a relative Jacobian generating unit to calculate a relative Jacobian of an end effector opposite to another one of the end effectors,
wherein the relative Jacobian generating unit acquires an impedance control input using a Jacobian matrix using the relative coordinate position.

14. The robot according to claim 13, wherein the relative position calculating unit calculates the relative coordinate position of an end effector from the absolute coordinate positions of another one of the plurality of end effectors opposite to the end effector.

15. The robot according to claim 14, wherein the relative coordinate position is a value obtained by subtracting the absolute coordinate position of the end effector from the absolute coordinate position of the end effector opposite to the end effector.

16. The robot according to claim 13, wherein the impedance control input is acquired by calculating the joint torques of the plurality of manipulators using the relative Jacobian and the relative coordinate position.

17. The robot according to claim 13, wherein the relative Jacobian generating unit to calculate a single relative Jacobian of an end effector opposite to another one of the end effectors.

* * * * *

UNITED STATES PATENT AND TRADEMARK OFFICE
CERTIFICATE OF CORRECTION

PATENT NO.           : 8,560,123 B2                                        Page 1 of 1
APPLICATION NO.      : 12/368673
DATED                : October 15, 2013
INVENTOR(S)          : Jong Do Choi It is certified that error appears in the above-identified patent and that said Letters Patent is hereby corrected as shown below:

In the Claims
In Column 8, Line 54, In Claim 4, delete "effectors–to" and insert -- effectors to --, therefor.
In Column 8, Line 59, In Claim 5, delete "effectors–from" and insert -- effectors from --, therefor.

Signed and Sealed this
Eighteenth Day of February, 2014

Michelle K. Lee
*Deputy Director of the United States Patent and Trademark Office*